(12) United States Patent
Zheng

(10) Patent No.: US 7,904,945 B2
(45) Date of Patent: Mar. 8, 2011

(54) SYSTEM AND METHOD FOR PROVIDING SECURITY FOR A WIRELESS NETWORK

(75) Inventor: Heyun Zheng, Altamonte Springs, FL (US)

(73) Assignee: MeshNetworks, Inc., Maitland, FL (US)

(*) Notice: Subject to any disclaimer, the term of this patent is extended or adjusted under 35 U.S.C. 154(b) by 1357 days.

(21) Appl. No.: 11/258,717

(22) Filed: Oct. 26, 2005

(65) Prior Publication Data

US 2006/0126845 A1    Jun. 15, 2006

Related U.S. Application Data

(60) Provisional application No. 60/622,169, filed on Oct. 27, 2004.

(51) Int. Cl.
*H04L 29/00* (2006.01)
(52) U.S. Cl. .................................. 726/4; 726/11; 726/12
(58) Field of Classification Search ............... 726/11–12; 713/153, 168; 709/217; 370/338; 395/200; 455/432.1
See application file for complete search history.

(56) References Cited

U.S. PATENT DOCUMENTS

| | | | |
|---|---|---|---|
| 6,023,563 A * | 2/2000 | Shani | 709/249 |
| 6,807,165 B2 | 10/2004 | Belcea | |
| 6,873,839 B2 | 3/2005 | Stanforth | |
| 7,107,620 B2 | 9/2006 | Haverinen et al. | |
| 7,133,670 B1 * | 11/2006 | Moll et al. | 455/432.1 |
| 7,280,519 B1 * | 10/2007 | Shane | 370/338 |
| 2002/0058502 A1 | 5/2002 | Stanforth | |
| 2002/0152299 A1 * | 10/2002 | Traversat et al. | 709/223 |
| 2004/0005058 A1 | 1/2004 | Jang et al. | |
| 2004/0025018 A1 * | 2/2004 | Haas et al. | 713/168 |
| 2004/0054926 A1 * | 3/2004 | Ocepek et al. | 713/201 |
| 2004/0064693 A1 * | 4/2004 | Pabla et al. | 713/168 |
| 2004/0076300 A1 | 4/2004 | Ishidoshiro | |
| 2008/0232338 A1 | 9/2008 | Ji et al. | |

FOREIGN PATENT DOCUMENTS

| | | |
|---|---|---|
| JP | 2004-180307 | 6/2004 |
| JP | 2004-208073 | 7/2004 |
| KR | 20040048528 A | 6/2004 |

(Continued)

OTHER PUBLICATIONS

L. Blunk, et al., "PPP Extensible Authentication Protocol (EAP)," Network Working Group, Request for Comments 2284, Mar. 1998.

(Continued)

*Primary Examiner* — Nasser Moazzami
*Assistant Examiner* — Ghazal Shehni
(74) *Attorney, Agent, or Firm* — Joseph J. Buczynski; Randi L. Karpinia

(57) ABSTRACT

A system and method for providing secure communication between nodes (102, 106, 107) in a wireless multihopping communication network (100). The system and method achieve secure communication in a multihopping wireless network (100) by, for example, providing a transport medium for transmission of multihopping authentication messages (400) by the infrastructure devices, such as intelligent access points (106) or wireless routers (107), and user devices, such as mobile nodes (102). The authentication messages (400) are used to verify the identity of a node (102, 107) to thus permit the node (102, 107) to communicate within the network (100). The system and method further use, for example, encryption techniques for protecting the content data packet (1000) traffic being transmitted the nodes (102, 106, 107) within the wireless network (100).

9 Claims, 9 Drawing Sheets

FOREIGN PATENT DOCUMENTS

| KR | 20040054348 A | 6/2004 |
|----|---------------|--------|
| KR | 1020040048528 A | 10/2004 |

OTHER PUBLICATIONS

IEEE Standard 802.1X-2001, "Port-Based Network Accesss Control," Section 7.

PCT International Search Report Application No. PCT/US05/38673 Dated Mar. 27, 2007—7 Pages.

Supplementary European Search Report mailed Jun. 5, 2009—European Application No. EP 05 81 9708—10 pages.

Young Kim—"802.11B Wireless LAN Authentication, Encryption, and Security" Internet Citation, [Online] XP-002250118. Retrieved from the Internet: URL:http://citeseerx.1st.psu.edu/viewdoc/summary?doi=10.1.1.14.6155> [retrieved on Aug. 4, 2003]—13 pages.

Young Kim—"802.11B Wireless LAN Authentication, Encryption, and Security" Internet Citation, [Online] XP-002250118. Retrieved from the Internet: URL:http://citeseerx.1st.psu.edu/viewdoc/summary?doi=10.1.1.14.6155> [retrieved on Aug. 4, 2003]—18 pages.

KIPO, "Notice of Preliminary Rejection," (English Translation), Dated Apr. 30, 2008, 3 pages.

KIPO, "Last Preliminary Rejection," (English Translation), Dated Nov. 25, 2008, 2 pages.

European Search Report Opinion Rejection, mailed Aug. 9, 2009, European Application No. EP 05 81 9708, 8 pages.

JAPA, "1st Office Action," (English Translation), Issued Aug. 25, 2009, JAPA# PFM1909, 12 pages.

\* cited by examiner

SYSTEM AND METHOD FOR PROVIDING SECURITY FOR A WIRELESS NETWORK

This application claims the benefit of U.S. Provisional Application No. 60/622,169, filed Oct. 27, 2004, the entire content being incorporated herein by reference.

FIELD OF THE INVENTION

The present invention in general relates to wireless communication networks, and in particular, to a system and method for providing secure communication between nodes in a wireless multihopping communication network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format. More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650; entitled "Ad Hoc Peer-to-Peer Mobile Radio Access System Interfaced to the PSTN and Cellular Networks", in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", the entire content of each being incorporated herein by reference.

As can be appreciated by one skilled in the art, the wireless links in the wireless network expose the data traversing the network to interception by eavesdroppers or "hackers". In a multihopping wireless network, this threat is even more serious due to the fact that the traffic is relayed through a series of intermediate nodes which may not be trusted or should not participate in routing traffic of other nodes due to performance or security considerations. These types of networks thus can benefit from an end-to-end security scheme that protects the data traffic from the source node, through the intermediate nodes, and to the destination node.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
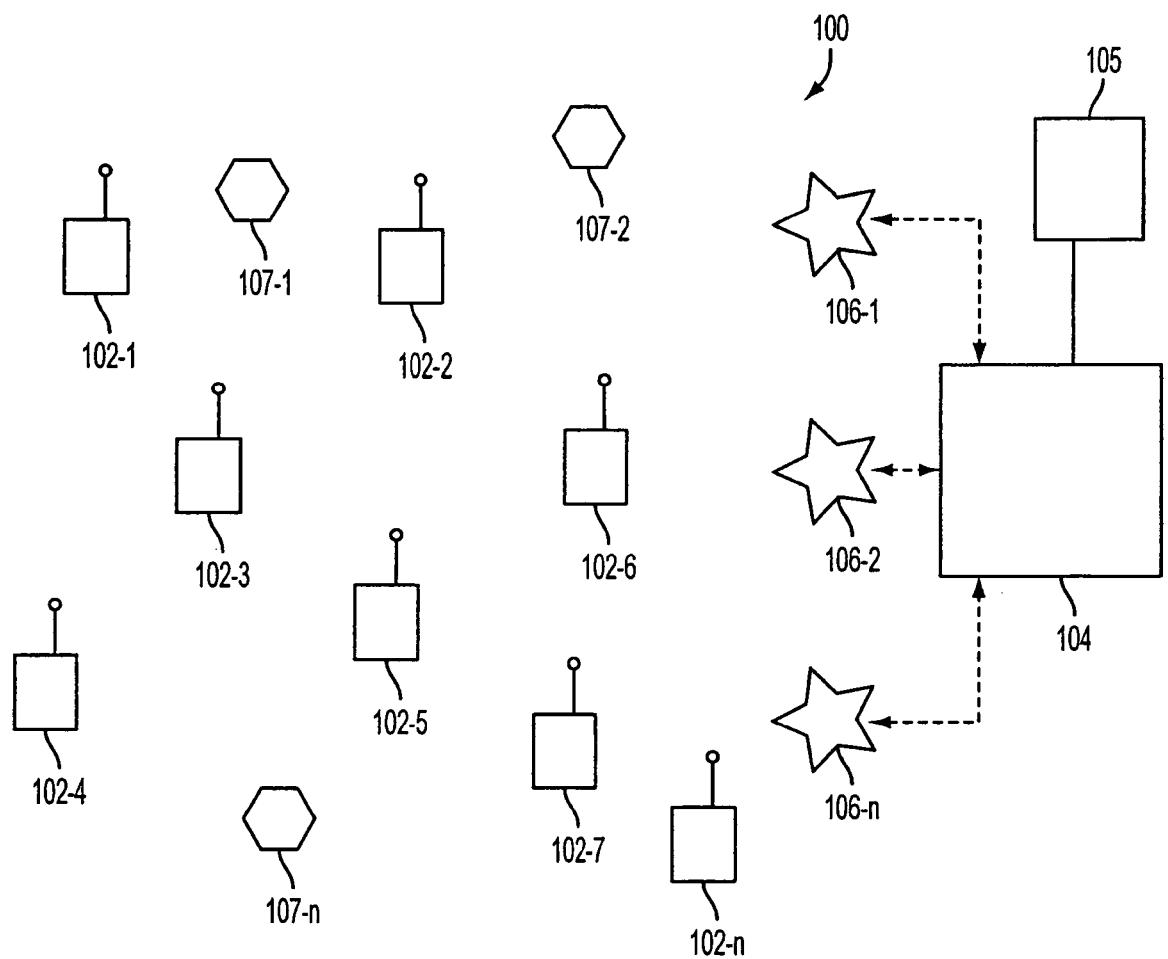
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for providing secure communication between nodes in a wireless multihopping communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for providing secure communication between nodes in a wireless multihopping communication network. The non-processor circuits may include, but are not limited to, a radio receiver, a radio transmitter, signal drivers, clock circuits, power source circuits, and user input devices. As such, these functions may be interpreted as steps of a method to perform operations for providing secure communication between nodes in a wireless multihopping communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described in more detail below, the present invention provides a system and method that is capable of providing secure communication between nodes in a wireless multihopping communication network. The system and method provide an end-to-end security scheme that protects the data traffic from the source node, through the intermediate nodes, and to the destination node in the wireless multihopping communication network. The system and method further provide secure peer-to-peer communication between nodes in a wireless network that can be used, for example, by public safety personnel such as firefighters and police officers, as well as in hospitals, airports, conventions or any other environment in which use of the network is restricted to authorized users. The system and method achieve secure communication in a multihopping wireless network by, for example, providing a transport medium for transmission of multihopping authentication messages by the infrastructure devices, such as intelligent access points or wireless routers, and user devices, such as mobile nodes. The system and method further achieve such secure communication by providing a peer-to-peer group authentication scheme for nodes (e.g., user devices) operating in the network, as well as a packet protection scheme for protecting data traffic transmitted between source and destination nodes within wireless domain.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as user devices 102, nodes 102 or mobile nodes 102), and can, but is not required to, include a fixed network 104 having a plurality of access points 106-1, 106-2, . . . 106-n (referred to generally as nodes 106, access points (APs) 106, or intelligent access points (IAPs) 106), for providing nodes 102 with access to the fixed network 104. The fixed network 104 can include, for example, a wired or wireless backbone such as a core local access network (LAN) or wide area network (WAN), and a plurality of servers and gateway routers to provide network nodes with access to other networks, such as other ad-hoc networks, the public switched telephone network (PSTN) and the Internet. In particular, the fixed network 104 includes an authentication server (AS) 105 for authenticating nodes in the network 100 as discussed in more detail below. The network 100 further can include a plurality of fixed routers 107-1 through 107-n (referred to generally as nodes 107, wireless routers (WRs) 107 or fixed routers 107) for routing data packets between other nodes 102, 106 or 107 and thus extending coverage of the network 100. It is noted that for purposes of this discussion, the nodes discussed above can be collectively referred to herein as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165; and 6,873,839, referenced above.

Figure 2:
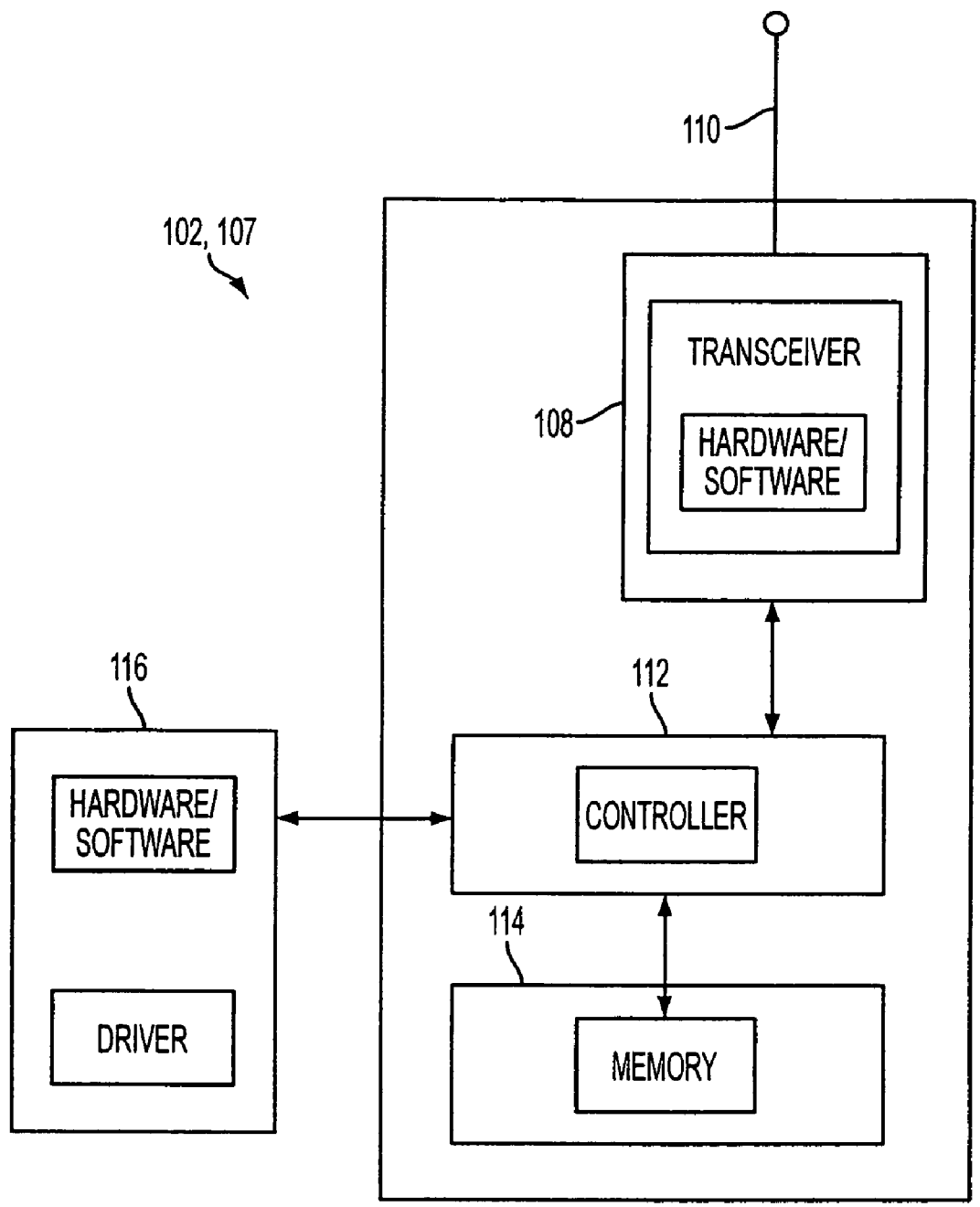
FIG. 2 is a block diagram illustrating an example of a mobile node and wireless router employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computed terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
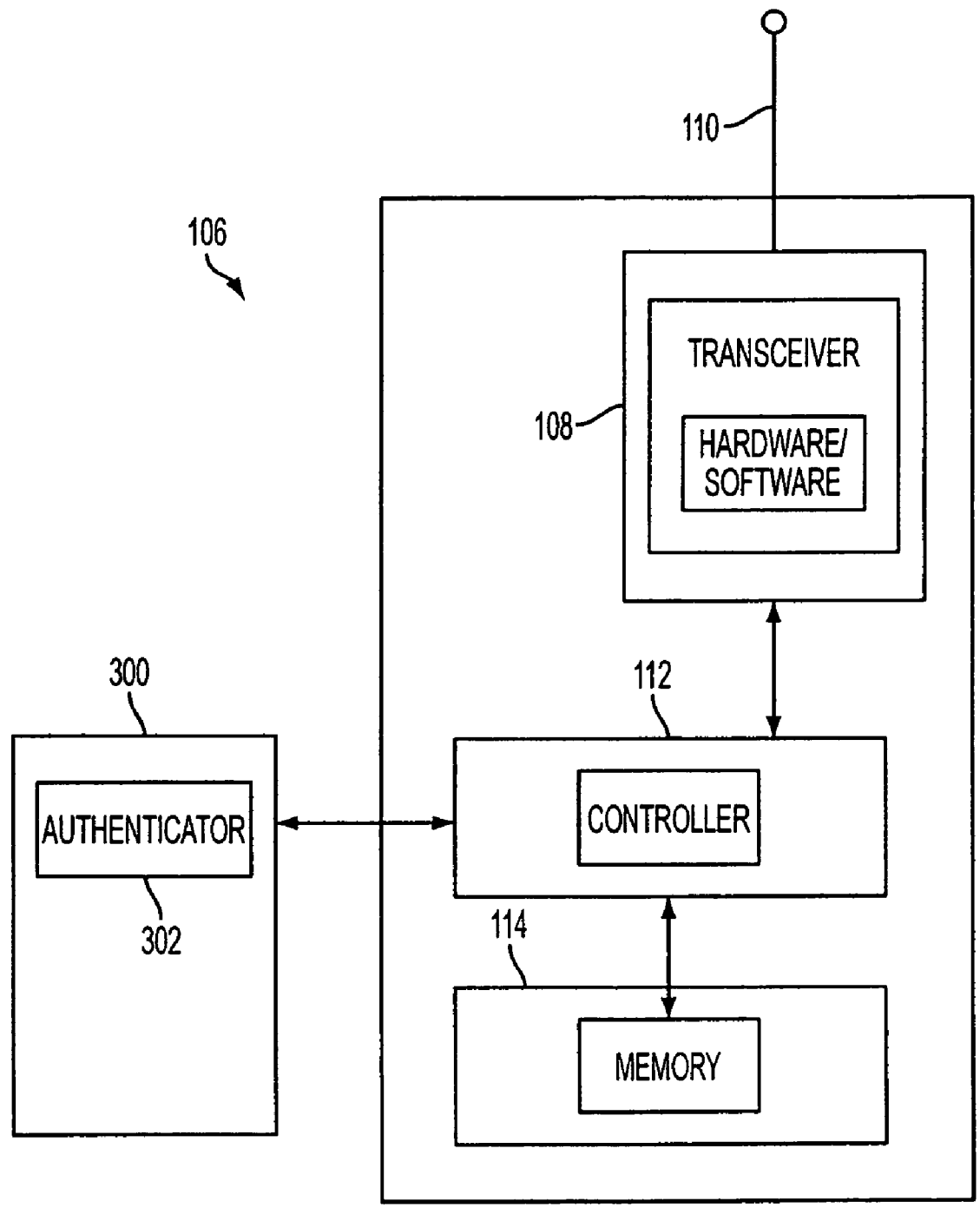
FIG. 3 is a block diagram of an example of an intelligent access point employed in the network shown in FIG. 1.

As shown in FIG. 3, a security gateway module 300 including an authenticator 302 complying with the Institute of Electrical and Electronics Engineers (IEEE) Standard 802.1x is included in or associated with each IAP 106 to provide required device or user authentication for network access control as discussed in more detail below, and the details of which can be found in the IEEE 802.1x specification, 2001, incorporated by reference herein. The authenticator 302 uses the services provided by the authentication server 105 to perform the user authentication operations as discussed in more detail below.

For example, before any WR 107 joins the network 100 and begins to communication with other nodes in the network 100, the WR 107 performs a mutual authentication protocol exchange between itself and an IAP 106 with which the WR 107 is associating. When a mobile node 102 attempts to access the wired network 104, a mutual authentication protocol exchange between the node 102 and the IAP 106 with which the node 102 is associated is performed. The security association established through such mutual authentication operations is thus used for network access control and data traffic protection. In this example, the transport protocol for authentication messages between the WRs 107 and IAPs 106 or the mobile nodes 102 and IAPs 106 is the Extensible Authentication Protocol Over LAN (EAPOL) of the IEEE Standard 802.1x, the details of which can be found in the IEEE 802.1x specification, 2001; (EAPOL & 802.1x) and in RFC 2284:; PPP Extensible Authentication Protocol (EAP), March 1998, the contents of both of these documents are incorporated herein by reference. By using EAPOL, different Extensible Authentication Protocols (EAPs) can be performed.

For example, in a multi-hopping network such as network 100, when a node 102 or WR 107 joins the network 100, the authentication protocol should operate transparently to all of the intermediate nodes such as other WRs 107 or other node 102. To achieve this, an embodiment of the present invention tunnels the authentication messages (e.g., EAP authentication messages) of the EAPOL in Layer 2 across those intermediate nodes. As understood in the art, "Layer 2", which is also known as the "data link layer" or media access control (MAC) layer, contains the physical address of a client (e.g., a node) or server station (e.g., AS 105). The LAP 106 that receives the EAP authentication message then filters out the EAP authentication message from other received communication, and sends the authentication messages to the AS 105 using a Remote Authentication Dial-In User Service (RADIUS) protocol, for example, if the AS 105 is a RADIUS authentication server.

As understood in the art, the user's credentials, such as user identification and password, are stored in advance in the RADIUS authentication Server 105, and are established in advance either by system administrator or user self-registration via some other communication channels. For example, when a device (e.g., a node 102 or WR 107) activates for the first time, the user of the node 102 or person deploying the WR 107 can be prompted to answer a series of questions via a different medium, such as a secured web site or telephone line, to activate his or her device (node 102 or WR 107). Also, each device (node 102 or WR 107) may have a serial number or other identifier that the network can recognize based on the network's security policy. At the very basic level, as long as the user identification and password typed in by the user are the same as the pre-configured user identification and password in the RADIUS authentication server 105, the RADIUS authentication server 105 permits the network 100 to allow access by that node 102 or WR 107.

Figure 4:
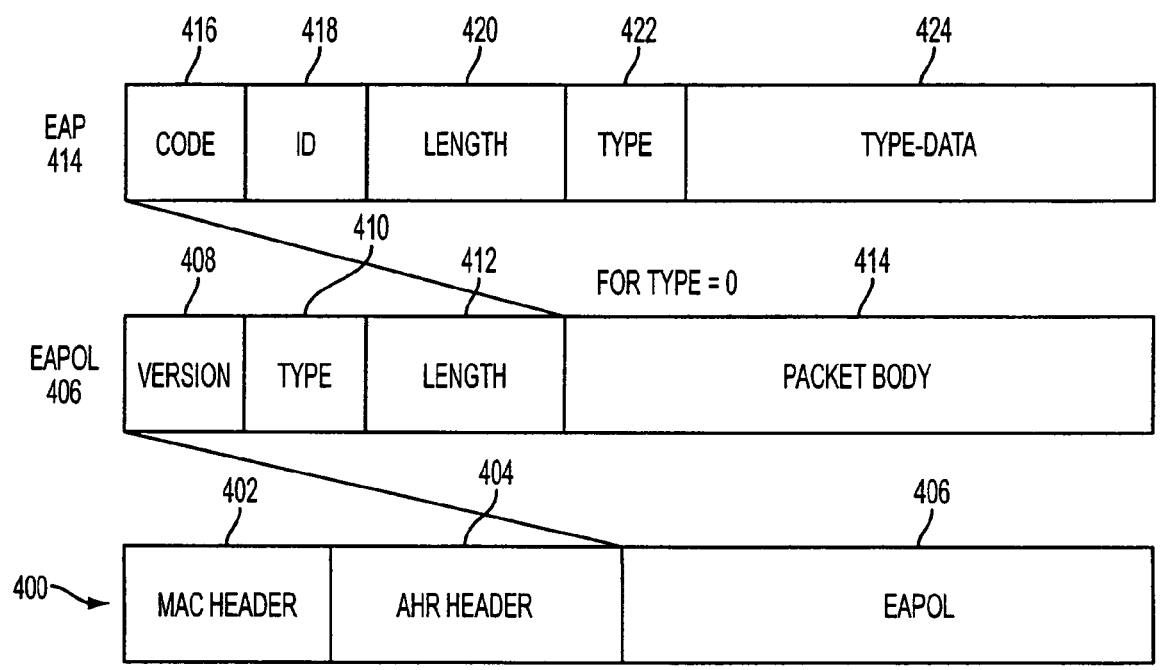
FIG. 4 is a conceptual diagram of an example of an authentication message packet transmitted by a node in the network shown in FIG. 1 during a process for establishing a secure communication according to an embodiment of the present invention.

FIG. 4 illustrates and example of the fields of the EAP and EAPOL portions of an authentication message packet 400, and thus demonstrates an example of the manner in which an EAP and EAPOL message is tunneled into a Layer 2 packet. As can be appreciated by one skilled in the art, the MAC header 402 contains the source and destination MAC addresses for a hop along the path between the supplicant (i.e., the node 102 or WR 107 desiring authentication) and the authenticator (i.e., an IAP 106). That is, the MAC header 402 contains the MAC address of the source node (e.g., a node 102) that transmitted the frame and the MAC address of the destination node (e.g. an intermediate node 102) that is to receive the packet 400 for each hop along the path. For example, when the supplicant (e.g., a node 102) transmits the packet 400 for receipt by the next hop node (e.g. another node 102) along the path to the authenticator (IAP 106), the MAC header 402 contains the MAC address of the supplicant node 102 and the next hop node 102. The ad-hoc routing (AHR) header 404 contains the MAC addresses of supplicant (e.g., node 102) and authenticator (e.g., AS 105). The frame 400 further includes the EAPOL field 406. A special protocol identification (ID) is placed in the AHR header protocol ID field (not explicitly shown) to represent the EAPOL field 406.

As further shown in FIG. 4, the EAPOL field 406 includes a Version field 408 identifying the version of the EAPOL protocol, a Type field 410 indicating the type of packet, such as an EAP-Packet, EAPOL-Start, EAPOL-Logoff, EAPOL-Key, or EAPOL-Encapsulated-ASF(Advanced Systems Format)-Alert, in the packet 400, a Length field 412 indicating the length of the packet 400, and the Packet Body field 414, which is the actual content of the EAPOL packet when a frame carries a Packet Type of EAP-Packet. The Packet Body (EAP) field 414 contains a Code field 416 which could be one of four type messages: Request, Response, Success and Failure, an ID field 418 used to aid in matching responses with requests, a Length field 420 indicates the length of the EAP packet including the Code, Identifier, Length, Type, Type-Data, a Type field 422 indicating the Type of Request or Response and a Data field that containing the actual data of the packet. The data field varies with the Type of Request and the associated Response. For example, the data field is the user identification for identity type response.

Figure 5:
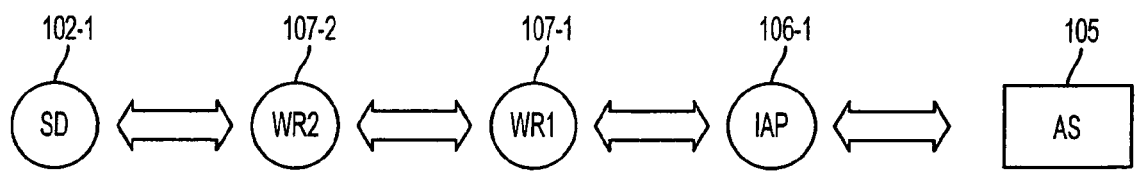
FIG. 5 is a conceptual block diagram illustrating an example of a secure communication being established between a node and an authentication server in the network shown in FIG. 1 according to an embodiment of the present invention.
Figure 6:
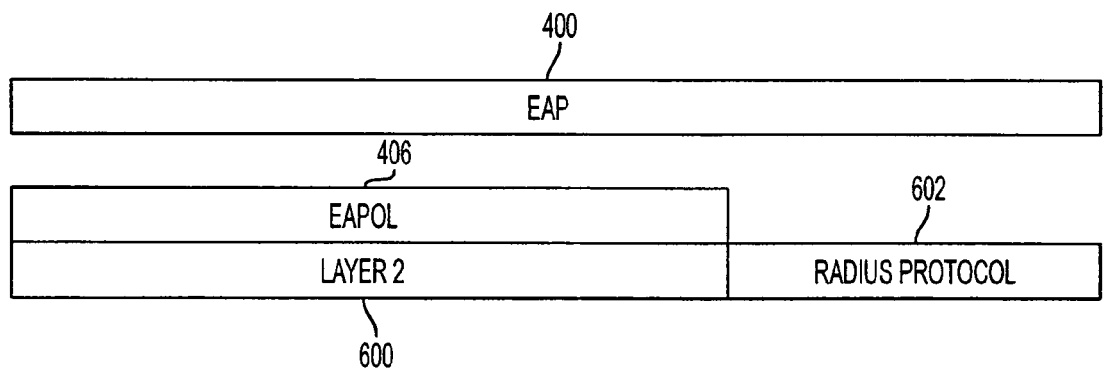
FIG. 6 is a conceptual diagram of the transmission of the authentication message shown in FIG. 4 according to an embodiment of the present invention.

FIGS. 5 and 6 illustrate an example of the manner in which an EAP authentication message 400 is transported between a node 102-1 attempting to access the network 100 and intermediate WRs 107-1 and 107-2 to an IAP 106-1, for authentication by the authentication server 105. Although FIG. 5 specifically illustrates an EAP authentication message being sent from a node 102-1, EAP authentication messages sent by a WR 107 attempting to gain access to the network 100 are handled in the same manner.

As shown in FIG. 6, the EAPOL field 406 of the EAP authentication message 400 is sent over Layer 2, identified by reference number 600, to the RADIUS authentication server 105. The transportation path between 102-1 and 106-1 is in the wireless domain. In this portion of the path, the authentication messages are carried over multi-hop Layer 2 frames 600 which are relayed through a number of intermediate nodes (e.g., nodes 102 or WRs 107). The final portion of the path from access point 106-1 to authentication server 105, which is over the wired network, the frames are carried through a User Datagram Protocol (UDP) based RADIUS protocol 602.

As discussed above, before any WR 107 or node 102 can become associated with an IAP 106, the WR 107 or node 102 and IAP 106 first perform a mutual authentication transaction. Any EAP techniques, such as Extensible Authentication Protocol—Transport Layer Security (EAP-TLS) or Extensible Authentication Protocol—Tunneled Transport Layer Security (EAP-TTLS), can be used for such purpose. After authentication, a unique session key is established between IAP 106 and authenticated device (e.g., node 102) as discussed below. This pair-wise session key is used to provide network access control to the node 102 (or WR 107) and protection to packets being transmitted by the node 102 or WR 107.

An example of the manner in which an embodiment of the present invention provides secure peer-to-peer communications between nodes 102, WRs 107 and/or IAPs 106 in the network 100 is now described with regard to FIGS. 7-11.

The scenarios of peer-to-peer communications within the wireless portion of the multihopping wireless network 100 (i.e., without the use of an IAP 106 to access the wired network 104) include a node 102 to another node 102, a WR 107 to another WR 107, and a node 102 to a WR 107. For peer-to-peer communications within the wireless network domain, the end-to-end security is desired, meaning security from the source node 102 to the destination node 102. In the case of a node 102 communicating with the wired network 104, the over the air links are protected (e.g., from the node 102, through the intermediate nodes 102 and/or WR 107, to the LAP 106), but the wired communication need not be protected in the manner described herein. The scenarios for peer-to-peer security can also be used for an ad-hoc wireless network without infrastructure or an infrastructure based wireless network, such as network 100 in which communication occurs between nodes 102 and/or WRs 107 and an IAP 106. In both cases, a Layer 2 route is used to establish the peer-to-peer security association.

Figure 7:
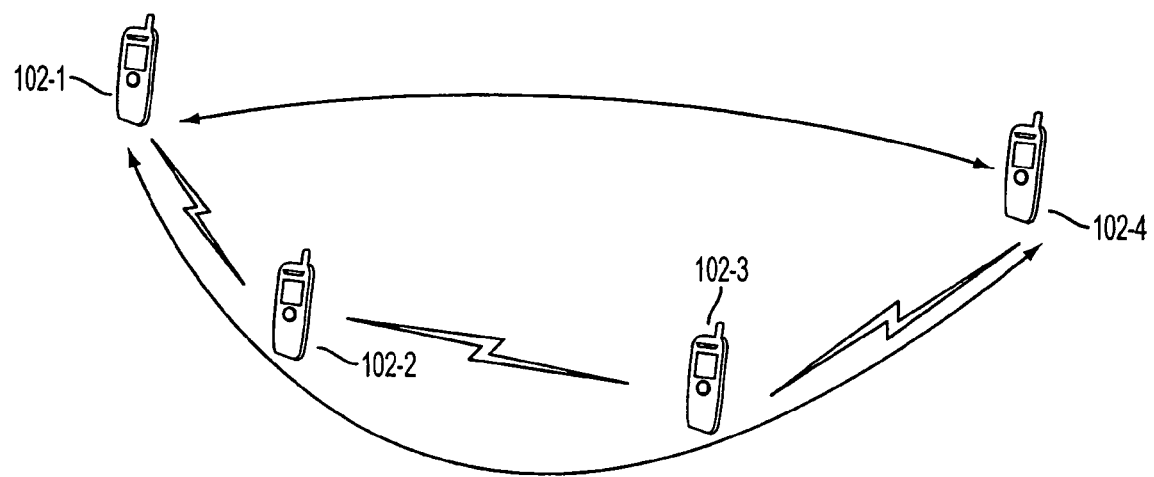
FIG. 7 is a conceptual block diagram illustrating an example of a secure communication between nodes in the network shown in FIG. 1 according to an embodiment of the present invention.
Figure 8:
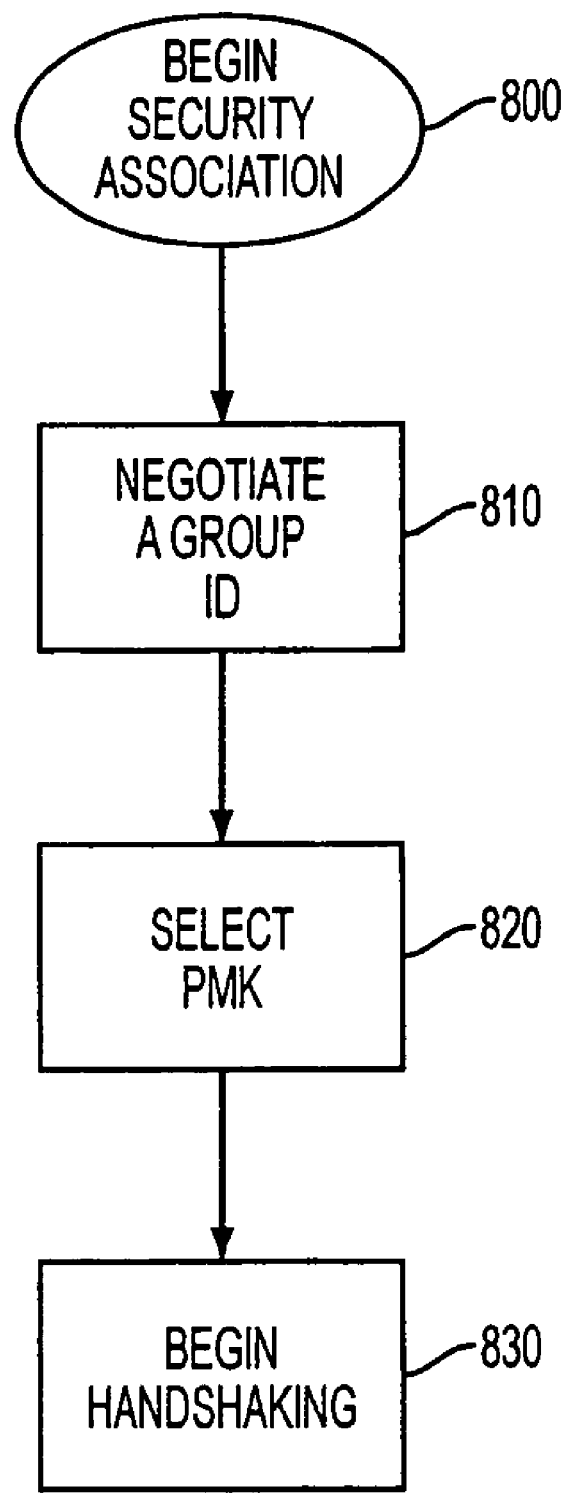
FIG. 8 is a flowchart illustrating an example of operations performed by nodes in the network shown in FIG. 1 for establishing a secure communication according to an embodiment of the present invention.
Figure 9:
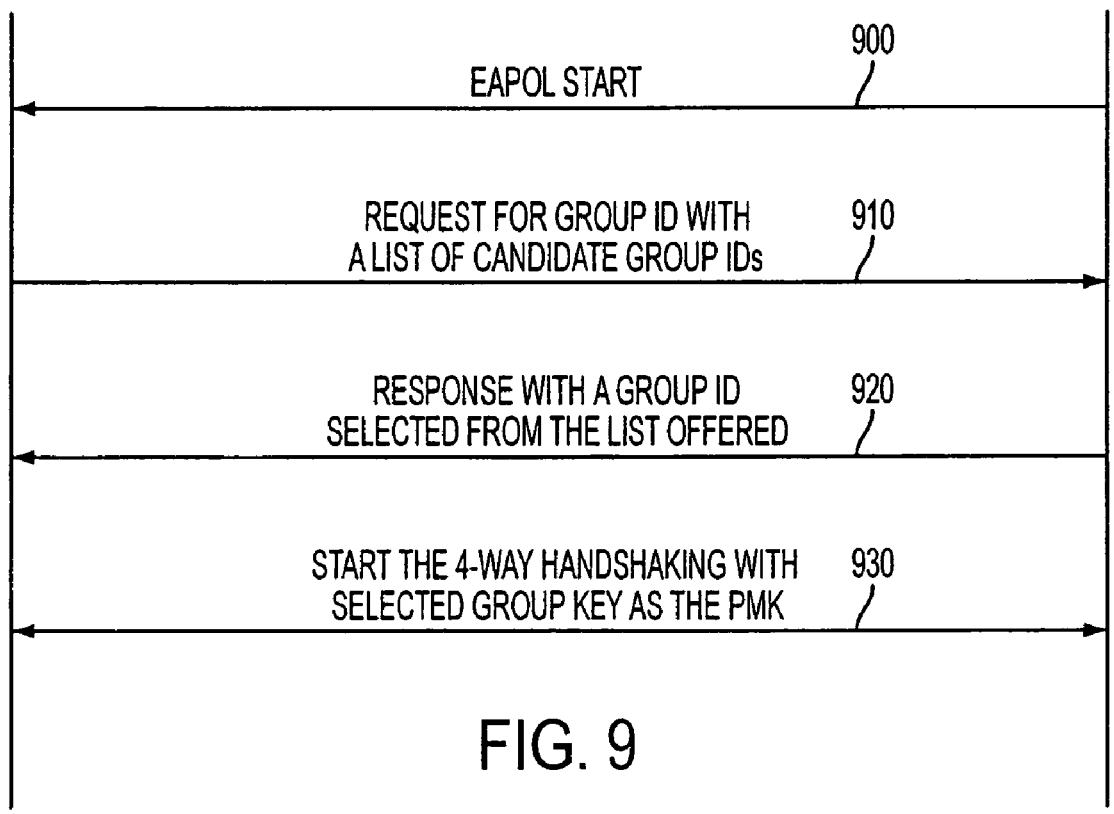
FIG. 9 is a flow diagram illustrating an example of messages exchanged between nodes in the network shown in FIG. 1 when establishing a secure communication according to an embodiment of the present invention.

The conceptual block diagram of FIG. 7, as well as the flowchart of FIG. 8 and the flow diagram of FIG. 9, illustrates an example where two wireless devices (nodes 102-1 and 102-4) need to communicate with each other securely. The intermediate nodes 102-2 and 102-3 may be trusted or not trusted. For purposes of this example, it is assumed that a route between nodes 102-1 and 102-4 then exists through nodes 102-2 and 102-3. According to an embodiment of the present invention, nodes 102-1 and 102-4 establish secure communication between each other in the following manner. It is noted that all of the operations described herein can be performed by the controller 112 and associated hardware and software of the nodes.

Each node 102-1 through 102-4 is configured with a series of group IDs and group passwords to be used as the peer-to-peer security association credential. These group IDs and group passwords can be stored, for example, in the respective memory 114 (see FIGS. 2 and 3) of the nodes 102-1 through 102-4. When node 102-1 attempts to send a packet destined to node 102-4 to, for example, node 102-2 (i.e., the next hop in the path to node 102-4), the security association begins in step 800, and the EAPOL protocol exchange 900 between nodes 102-1 and 102-2 begins shown in FIG. 9. To establish a security association between two nodes (e.g., nodes 102-1 and 102-2), the nodes 102-1 and 102-2 negotiate a group ID in step 810 by node 102-1 sending a message 910 to node 102-2 requesting a list of candidate group IDs. Node 102-2 determines which group password (group key) is selected in step 820 as the pair wise master key (PMK) to protect the data that travels between the nodes 102-1 and 102-2 when the (four-way) 4-way handshaking is performed in accordance with IEEE Standard 802.11i, and sends a response 920 to node 102-1 identifying the PMK to be used. The 4-way handshaking 930 between nodes 102-1 and 102-2 then begins in step 830.

That is, as can be appreciated by one skilled in the art, after the PMK has been established and node 102-1 attempts to send a data packet to node 102-2, node 102-1 sends a request-to-send (RTS) message to node 102-2 to determine the availability of node 102-2. When node 102-2 receives the RTS and node 102-2 can receive the data packet, node 102-2 sends a clear-to-send (CTS) message to node 102-1. Upon receiving the CTS message, node 102-1 sends the packet to node 102-2. The data packet includes a field containing the PMK that has been established. Upon successful receipt of the data packet, node 102-2 sends an acknowledgement (ACK) message to node 102-1, and if node 102-2 does not successfully receive the packet, node 102-2 sends a non-acknowledgement (NACK) message to node 102-1. Hence, the 4-way handshaking consists of the exchange of an RTS message, a CTS message, the data packet, and an ACK or NACK message between nodes 102-1 and 102-2.

The above process is repeated as the packet is transmitted between each node in the path. That is, prior to node 102-2 sending the packet to node 102-3, nodes 102-2 and 102-3 perform the operations for negotiating the PMK as discussed above, and then use this PMK during the 4-way handshaking process to send the packet from node 102-2 to node 102-3. Likewise, the process is performed between nodes 102-3 and 102-4 when node 102-3 attempts to send the packet to the destination node 102-4. Once a security association is established between two end points, whether it is between a node 102 and an IAP 106 or between two subscriber devices, the user traffic can be protected according to the security protection mode in the security association.

It is further noted that according to an embodiment of the present invention, an encryption and Message Integrity Code (MIC) is used to provide several security services for each packet, namely, data origination authentication, data integrity protection, replay attack protection and data confidentiality. For example, the MIC can be used to authenticate the origin of the data in the packet because the MAC address of the source node (node 102-1 in this example) is included in the computation of the MIC. Hence, any attempt to spoof the MAC address of the source node 102-1 can be detected by the destination node (e.g., node 102-4). The Layer 2 data payload of the packet is protected by MIC, and thus, any modification to the data can be detected by the destination node 102-4. Also, each packet is numbered so that the destination node 102-4 can detect any replayed (retransmitted) packet. Furthermore, the data in the packet can be encrypted at the source node 102-1 by any known encryption scheme, and decrypted at the destination node 102-4.

Figure 10:
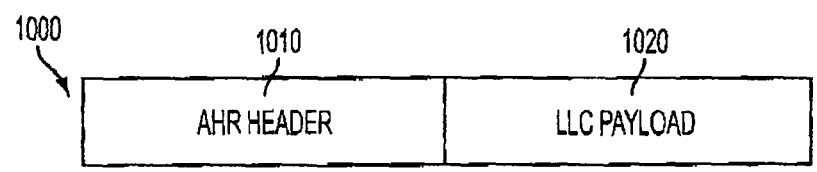
FIG. 10 is a conceptual diagram of an unencrypted data packet.
Figure 11:
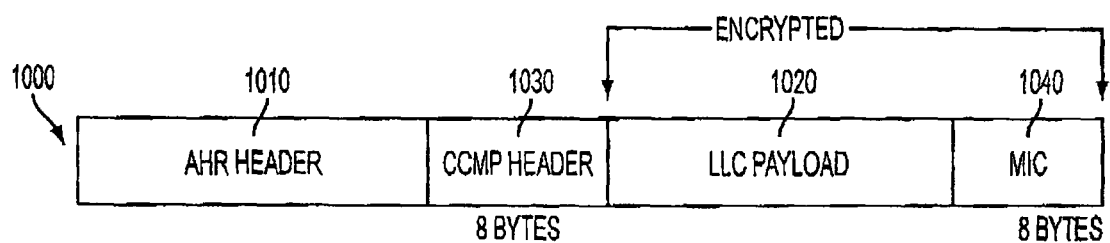
FIG. 11 is a conceptual diagram of the data packet shown in FIG. 10 encrypted.

For example, as shown in FIGS. 10 and 11, each data packet 1000 can be encrypted using a Counter-Mode-CBC-MAC Protocol (CCMP) as known in the art, or an Advanced Encryption Standard (AES) algorithm that is designated as the preferred data encryption algorithm for all government related transactions, and is considered in IEEE Standard 802.11i as a potential long term solution for WLAN security. As understood in the art, AES is newly designated as the data encryption algorithm for all government transactions. Accordingly, any would-be hackers, as well as the intermediate nodes 102-2 and 102-3, cannot open the packets.

As shown in FIG. 10, a data packet 1000 includes at least an AHR header 1010 and a logical link control (LLC) payload 1020 that includes the data, which can be audio, video, multimedia or data, for example. After the encryption, the data packet 1000 includes a CCMP header 1030 and an MIC field 1040.

It should also be noted that it is not necessary for a node (e.g., node 102-1) to invoke all of the security features discussed above. For example, if a user of the node 102-1 wished to deactivate the security feature, the security association is set to a NULL type and thus, the operations for performing the security association and establishing a PMK are not performed. Furthermore, the user of the node 102-1 can chose to have the data sent without confidentiality, for example, when the data itself is not deemed confidential, but access to the network 100 is controlled. In this event, the MIC code can be placed in the packet, but the data in the packet is not encrypted. If the user of the node 102-1, however, wishes to use all of the security features mentioned above, then the node 102-1 and node 102-2 can perform all of the operations as discussed above.

In the foregoing specification, specific embodiments of the present invention have been described. One of ordinary skill in the art, however, appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for providing secure communication in a wireless multi-hop communication network, the method comprising:

storing within each of a plurality of nodes operating within the wireless communication network a respective series of group identifications and a respective series of group passwords;

creating a secure communication path between a source node and a destination node of the plurality of nodes by:
 establishing a security association between the source node and a next hop node by negotiating a group identification including selecting a group identification stored in both the source node and the next hop node, and
 using a group password associated with the group identification as the pair wise master key to protect at least one data packet communication between the source node and the next hop node;

determining if the next hop node is the destination node; and when the next hop node is not the destination node, repeating the creating of a secure communication path between the next hop node and a further next hop node and repeating the determining step; and when a secure communication path has been established between each of the nodes between the source and the destination node, securely communicating one or more data packets between the source node and the destination node.

2. A method as claimed in claim 1, further comprising prior to creating the secure communication path:

authenticating each of the plurality of nodes by:
 transmitting an authentication message over a Layer 2 medium from the node, through each of a plurality of intermediate nodes, to an access point that provides access to a wired network;
 forwarding the authentication message to an authentication server by the access point; and
 determining, based on the authentication message, whether the node is authorized to communicate in the wireless communication network by the authentication server.

3. A method as claimed in claim 2, further comprising:
when the authentication server determines that the node is authorized to communication in the wireless communication network, informing the node of its authorization.

4. A method as claimed in claim 2, wherein:
the access point sends the authentication message to the authentication server using a transport medium other than Layer 2.

5. A method as claimed in claim 2, wherein:
the authentication message comprises a media access control header, an ad-hoc routing header, and an Extensible Authentication Protocol Over Local Area Network (EAPOL) field.

6. A method as claimed in claim 1, wherein:
each of the plurality of nodes is one of a user device and a wireless router.

7. A method as claimed in claim 1, further comprising:
including in the data packet a code for identifying the source node as an origin of the data packet.

8. A method as claimed in claim 7, further comprising:
generating the code based on the media access control address of the source node.

9. A method as claimed in claim 1, further comprising:
encrypting at least a portion of the data packet before transmitting the data packet from the source node to the next hop node.

* * * * *

UNITED STATES PATENT AND TRADEMARK OFFICE
CERTIFICATE OF CORRECTION

| | | |
|---|---|---|
| PATENT NO. | : 7,904,945 B2 | Page 1 of 1 |
| APPLICATION NO. | : 11/258717 | |
| DATED | : March 8, 2011 | |
| INVENTOR(S) | : Zheng | |

It is certified that error appears in the above-identified patent and that said Letters Patent is hereby corrected as shown below:

In Column 4, Line 38, delete "computed" and insert -- computer --, therefor.

In Column 5, Line 6, delete "2001;" and insert -- 2001 --, therefor.

In Column 5, Line 7, delete "2284:;" and insert -- 2284; --, therefor.

In Column 5, Line 22, delete "LAP" and insert -- IAP --, therefor.

In Column 7, Line 4, delete "LAP" and insert -- IAP --, therefor.

Signed and Sealed this
First Day of January, 2013

David J. Kappos
*Director of the United States Patent and Trademark Office*